Figure 5:
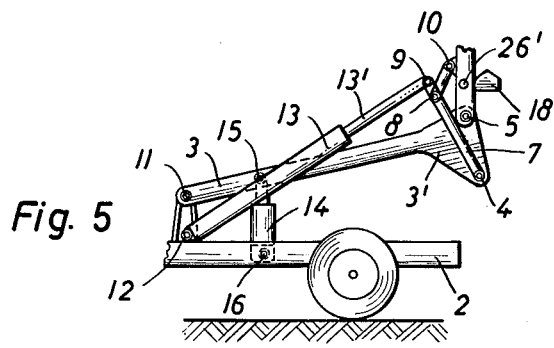

Oct. 9, 1962   L. SAUER   3,057,490
VEHICLE WITH LOADING DEVICE
Filed Aug. 7, 1959   3 Sheets-Sheet 1
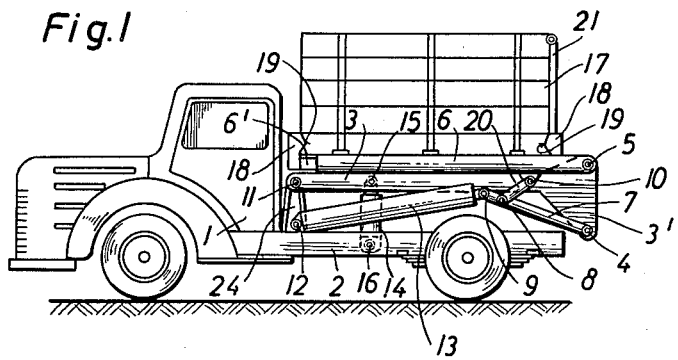
Fig. 1
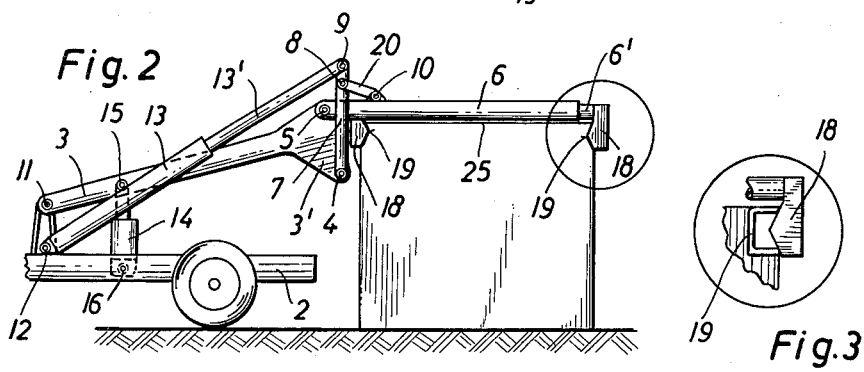
Fig. 2
Fig. 3
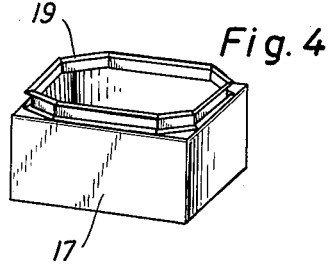
Fig. 4
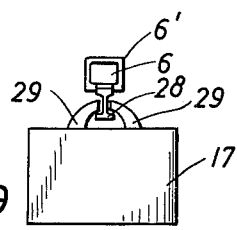
Fig. 9
INVENTOR
L. Sauer
BY
Glascock Downing Seebold
ATTYS.

Oct. 9, 1962 L. SAUER 3,057,490
VEHICLE WITH LOADING DEVICE
Filed Aug. 7, 1959 3 Sheets-Sheet 3

INVENTOR
L. Sauer
BY
ATTYS.

United States Patent Office 3,057,490
Patented Oct. 9, 1962

3,057,490
VEHICLE WITH LOADING DEVICE
Leo Sauer, Schevenhutte uber Eschweiler, Hardthofer
Weg 1, Germany
Filed Aug. 7, 1959, Ser. No. 832,191
Claims priority, application Germany Aug. 19, 1958
16 Claims. (Cl. 214—77)

This invention relates to a vehicle for taking up, transporting, tipping and setting down goods by means of a preferably hydraulically operable loading device.

The known devices of this kind have the disadvantage that the tipping angle is not great enough in order for example to completely invert a container and tip it out. A further disadvantage of the known vehicle is that the load has to be mounted between the vehicle wheels or the lever arrangements used for tipping so that the loading space is considerably limited, particularly in width.

A purpose of the invention is so to construct a loading device for taking up, transporting, tipping and setting down a load that on one hand complete turning over of the load or a container is possible and that on the other hand the whole breadth of the vehicle is available for loading space.

In a vehicle having a loading device which consists of a swinging arm pivoted on the vehicle at about the level of the loading surface and a boom pivoted to the free end of the swinging arm, both members being independently operable preferably hydraulically, according to the invention the purpose aimed at is achieved by the swinging arm and boom being foldable together in the position of transport. The boom pivoted to the free end of the swinging arm and itself rockable through a large angle can be brought into a substantially horizontal position for transport. The load in the transport position of the loading device can rest on the boom so that in the folded condition the surface of the boom which is uppermost can form at least a part of the loading surface over its whole length. Advantageously in this position the boom is supported on the swinging arm.

The swinging arm permits a relatively limited swinging movement which substantially only raises and lowers the point at which the boom is pivoted without causing any swinging worth mentioning of the load or the container for the load. The boom pivoted to the end of the swinging arm however permits an adjustment of the load or the load container to any desired angle. Advantageously both movements can be effected independently of one another. This has the advantage that the load or container can be set to the angle desired at any adjustment of level. The container or load can therefore be adjusted vertically or inclined to tip it or can be turned right over. The level can be suited to the requirements of the case.

In particular a container receiving the load can for example be set upside down on the vehicle in which case care must naturally be taken that its opening is closed. The container can then be placed right way up on the ground behind or in front of the vehicle. In addition it can take any intermediate tipped position. Further the container instead of being set down on its own vehicle can also be set down on a trailer. Still further it is possible to effect stacking of containers with the device according to the invention.

A particular embodiment of the invention is characterised by a swinging arm one end of which is pivoted to the vehicle and the other end of which carries the pivot point for the rockable boom and a further pivot point for a transmission lever which serves for rocking the boom through an intermediate link.

This construction according to the invention makes possible the carrying out of the various movements above described with particularly simple constructional means.

The invention can further be characterised by a double acting (pull and push) hydraulic device one point of application of which is in the neighbourhood of the pivot for the swinging arm and the other point of application of which is at the outer end of the transmission lever.

Advantageously the point of application of the double acting device on the vehicle frame is located below the pivot for the swinging arm. The end of the transmission lever on which the other point of application of the double acting hydraulic device is provided projects preferably a little beyond that point at which the link is pivoted to the transmission lever.

According to a further development of the invention a double acting (push-pull) hydraulic device can serve also for effecting the movement of the swinging arm.

By the provision of double acting hydraulic devices both for the rocking of the boom and the movement of the swinging arm particularly simple control is provided. Naturally however instead of hydraulic pull and push devices other devices can be used within the scope of the invention, particularly mechanical devices e.g. screw spindles or the like.

A particularly advantageous embodiment of the invention is characterised by a distance of the pivot for the boom from the pivot for the transmission lever at the end of the swinging arm, by a length of the transmission lever from its pivot on the swinging arm to the pivot for the link, by a length of this link between its pivotal connection to the transmission lever and that to the boom, and by a distance from the pivot from the boom at the end of the swinging arm to the position of the pivot for the link such that during the pull or push movement of the double acting device the boom can carry out a rocking movement of at least 180°.

The rocking movement of at least 180° is particularly advantageous as regards the universal use of parts to be attached to the boom which will be described in detail below.

In detail lengths of about the following values have been found advantageous. The distance between the pivot for the boom and the pivot for the transmission lever can be about ¾ of the distance from the pivot of the transmission lever to the pivotal connection of the link to the transmission lever. The length of the link can advantageously be about ½ the distance from the pivot of the boom to the pivot of the transmission lever. The distance from the pivot of the boom to the pivotal connection of the link to the boom is approximately the same as the distance from the pivot of the boom to the pivot of the transmission lever. Further, the distance of the pivotal connection of the link to the transmission lever from the pivotal connection of the double acting hydraulic device to the transmission lever may advantageously be about ½ the length of the link.

A further development of the invention is characterised by a boom the length of which is advantageously adjustable, preferably hydraulically. By this provision, by shortening the length of the boom the load can be held or clamped. This applies particularly to containers.

Another development of the invention is chacterised by clamping jaws on the boom which serve to cooperate with a correspondingly shaped rim on a container. In this way a particularly reliable engagement and holding of the container is ensured.

Advantageously the rim of the container can be of octagonal form and the jaws of the boom be so shaped that they bear on three sides of the rim. Engagement on three sides not only ensures a very reliable hold but also and especially ensures centering of the container in the horizontal direction in particular in a direction transverse to the vehicle, after engagement by the clamping jaws.

A somewhat different embodiment of the invention is characterised by a round rim on the container and correspondingly shaped clamping jaws. With this form also there is not only centering in the longitudinal direction of the vehicle but also in the transverse direction when the clamping jaws are moved towards one another.

A further development of the invention is characterised by upwardly and downwardly inclined surface parts on the clamping jaws and corresponding surface parts on the rim of the container, for the purpose of centering the container in height during closing of the jaws. In this way it suffices if the container is merely placed within the range of movement of the clamping jaws. The container is then centered in height by the bringing together of the clamping jaws quite apart from its being centered laterally by the measures above described.

A somewhat different embodiment of the invention is characterised by prongs on the boom disposed after the fashion of a rake. A boom provided with such prongs is adapted to heap up suitable material. This construction is particularly adapted to seize and gather up sugar cane.

Yet another embodiment of the invention is characterised by provision on the boom of prongs corresponding in shape to the material to be gathered up. This construction comes into question for seizing and transporting rolls, chests, bales, barrels, etc.

Another embodiment of the invention is characterised by blades on the boom. This arrangement can serve in particular for scraping, transport and loading of snow, gravel, earth, soft coal and so forth. By setting the boom at an appropriate angle the gathering of sugar cane or scraping of earth can be effected both during the forward and backward movement of the vehicle. This is a great advantage of the arrangement according to the invention.

Apart from the above mentioned spheres of use, the invention also comes particularly into use for carting of rubbish. Particularly for this purpose but also for the lifting of other loads, a hook can be provided at the end of the boom.

The invention further provides for the boom to have a cover plate which serves for automatically closing an open container.

In further application of the invention, in particular the hook at the extendable end of the boom can be used for positioning objects, laying of pipes, lifting of dust containers from below street level which have been filled by street sweeping machines, and lifting operations in general.

In detail the device according to the invention can be characterised by the incorporation in the boom of a cylinder and piston, one clamping jaw, row of prongs, blade or the like being arranged on one end and the other clamping jaw, row of prongs, blade or the like at the other end.

A particular advantage of the apparatus according to the invention is afforded by the fact that the hydraulic pull and push device for rocking the boom can be held under tension whereby rattling of the device on the vehicle during transport is reliably avoided. This also applies to any empty container which may be carried by the boom.

A further advantage of the invention is afforded by the fact that the device according to the invention can be arranged completely underneath the load or container so that the width of the container is not limited by the presence of any levers or the like. This arrangement has the further advantage that the whole device is to a considerable extent protected.

The container may be so constructed that the rim has pairs of opposite sides similarly formed in such a way that the containers can be approached from all four sides and gripped by the clamping jaws.

The invention will be further described with reference to some examples illustrated in the accompanying drawings.

Figure 6:
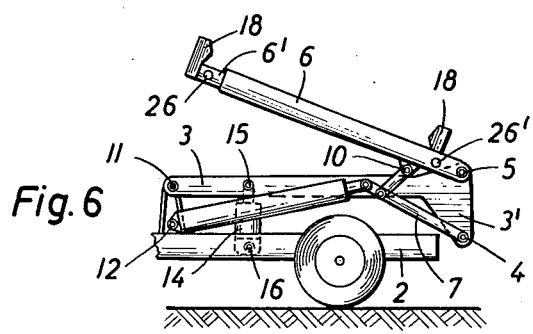
Figure 7:
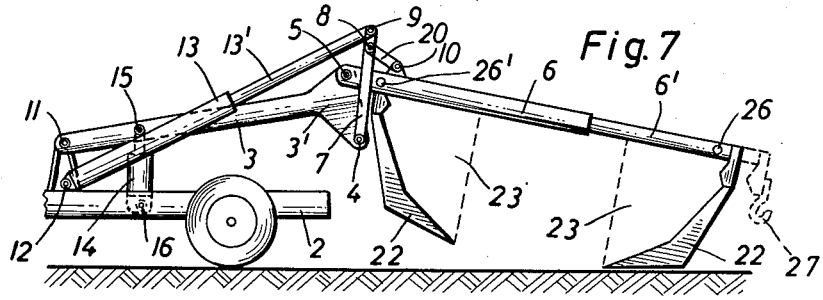

FIGURE 1 is a side view of the complete vehicle with the device according to the invention folded up and a container in position, FIGURE 2 is a side view of the loading device according to the invention in its extended position with a container set down, this figure showing that the container can be of greater height than that shown in FIGURE 1, FIGURE 3 is a detail on an enlarged scale showing a container rim and one clamping jaw, FIGURE 4 is a perspective view of the container showing in particular its upper rim, FIGURE 5 is a side view of the loading device according to the invention in a position in which the boom is vertical, FIGURE 6 is a side view of the loading device according to the invention in which the boom has been raised a little from the fully folded position, FIGURE 7 is a side view of the device in a position corresponding approximately to that of FIGURE 2 but in which the boom is provided with prongs or blades.

Figure 8:
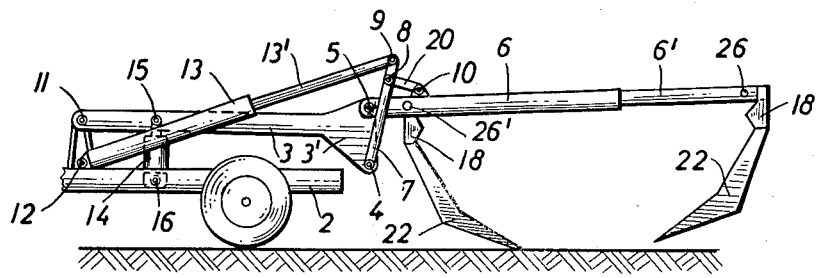
Figure 10:
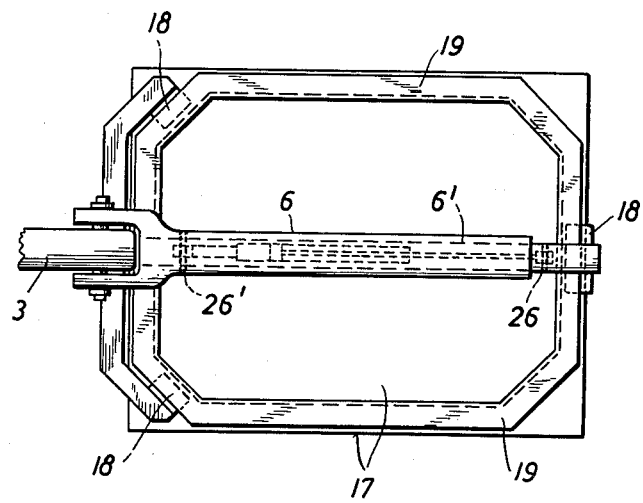

FIGURE 8 is a side view of the device with the boom in a position similar to that of FIGURE 7 but in a position for scraping by rearward movement whereas the position of FIGURE 7 is that for scraping on the forward movement, FIGURE 9 is a detail end view showing an alternative way of attaching the container to the boom, and FIGURE 10 is a top plan view showing the clamping jaws engaging the rim of the container of octagonal form, the swinging arm being broken away.

The vehicle 1 has a chassis frame 2. On the chassis frame 2 is secured for example a pedestal 24 to the upper end of which a swinging arm 3 is pivoted to the point 11, the outer end of which is marked 3'. To the end 3' of the arm 3 a boom 6 having an extendable end 6' is pivoted at the point 5. A transmission lever 7 is pivoted to the arm at the point 4. A double acting hydraulic device 13, 13' one end of which is pivoted at the point 12 below the pivot 11 and the other end of which is pivoted to the transmission lever 7 at 9, serves for operating the transmission lever 7. An intermediate link 20 which is pivoted at 8 to the transmission lever 7 and at 10 to the boom 6 serves for transmitting the movement of the lever 7 to the boom 6. The various parts of the mechanism have the proportions above described and an operation of the hydraulic device 13, 13' effects a rocking movement of the boom 6 about the pivot 5 in all of more than 180°.

Independently of the above described movement, the swinging arm 3 can have its outer end raised and lowered by a double acting hydraulic device 14 which is pivoted to the vehicle chassis frame 2 at 16 and to the swinging arm 3 at 15. A typical range of possible positions of the swinging arm and of the boom which can be obtained by this means are visible in FIGURES 1, 2 and 5 to 8.

The container 17 has a rim 19 which serves for gripping by means of clamping jaws 18. To actuate the clamping jaws 18, the boom 6, 6' can be adjusted in its length, preferably hydraulically. To this end a hydraulic cylinder and piston are mechanically coupled by the aid of bores 26, 26'. Through these mechanical couplings the parts 6 and 6' of the boom share in the relative movements between the cylinder and piston. The container can be provided with an emptying flap 21 which can also be used during filling.

To ensure vertical centering of the container, as will be seen in FIGURES 2 and 3 the jaws 18 have faces which slope upwardly and downwardly from the centre, while the rim 19 of the container is of channel section.

To ensure centering in the plane transverse to the vehicle the rim may conveniently be of octagonal form as shown in FIGURE 4.

As can be seen particularly in FIGURE 2, the container is gripped by the clamping jaws in its upright position, that is with its opening upward, and thereafter is swung right over and placed inverted on the vehicle and there held. So that the material with which the container has been filled may not then fall out, a cover plate 25 is provided on the boom which when the container is gripped, automatically rests on the opening.

In another embodiment, FIGURE 7, prongs 22 are provided rake fashion on the boom, or instead blades 23 can be provided as indicated by dotted lines. Further a load hook 27 can be provided at the end of the boom 6, 6'.

Comparison of FIGURES 7 and 8 will show that with the boom 6, 6' suitably disposed, scraping and gathering can directly be effected during forward or backward movement of the vehicle.

According to a further embodiment provision may be made for bringing the container 7 on to the beam 6 as follows: Instead of the rim 19 the container, can at the top have for example a rail, and the boom on its underside have a slotted pocket which has a form similar to the jaws of a half opened pair of pincers. The rail on the container can have a similar form to a railway rail and when the container is taken up by means of the boom has its web engaged by the slotted pocket. If desired the parts of the pocket can be movable so that they can clamp the rail after engaging it. Also more than one rail can be provided on the container and more than one pocket on the boom.

Further this arrangement can be reversed as shown in FIGURE 9 so that the boom has one or more rails on its underside while a corresponding slotted pocket or pockets are provided on the top of the container. Thus the container 17 can have a pocket 29 slotted at the top, in which a rail 28 can slide which is secured to the underside of the boom 6. After the rail 28 has been run in, its web lies in the slot of the pocket 29.

As can be seen in FIGURE 10, three clamping jaws 18 are disposed on three sides of a rim 19 of octagonal form. One of them engages the mid-point of one transverse part of the rim while the other two engage the inclined corner at the other end.

I claim:

1. A vehicle of the type described including a frame, arm means having opposite end portions, means pivotally connecting one end portion to the frame for movement about a horizontal axis, operating means between the frame and the arm means for raising the arm means from a substantially horizontal position to an inclined position, boom means, means pivotally connecting the boom means to the other end portion of the arm means for swinging movement at least 180° in the same plane as the arm means to allow the boom means to overlie and be supported by the arm means for defining the transport position and to other positions, clamping means on the boom meam adapted to grip the load to be transported from above when said arm means is in said other positions and which clamping means project upwardly when the boom means is in the transport position for holding the inverted load in a horizontal position, movement imparting means operably connected to the other end portion of said arm means below the pivotal connection of the boom means to the other end portion of the arm means and means pivotally connecting the boom means to the movement imparting means above the pivotal connections of the movement imparting means and boom means respectively to said other end portion of the arm means for swinging the boom means about its pivotal connection to the other end portion of the arm means.

2. A vehicle of the type described including a frame, an arm pivoted to the frame for movement toward and away from the frame and provided with a free end, boom means pivotally attached to the free end of the arm for swinging movement to a position overlying and being supported by the arm constituting the transport position and to other positions relative to the frame through an arc of at least 180°, load clamping means carried by the boom means and extending upwardly therefrom when the boom means is in the transport position, lever means having opposite ends, means pivoting one end of the lever means to the free end of the arm below the pivotal attachment of the boom means to said free end, extensible and retractable means pivotally connected to the other end of said lever means, means pivotally connecting said extensible and retractable means with the frame at a point below the pivot of the arm to the frame, link means having opposite ends, means pivoting one end of the link means to the lever means in proximity to the pivotal connection between the extensible and retractable means and the other end of the lever means, means pivotally connecting the other end of the link to the boom, the length of the lever means being greater than the distance between the means pivoting the lever means to the free end of the arm and pivotal attachment of the boom means to the free end of the arm and the length of the link means being substantially less than the distance between the pivotal attachment of the boom means to the free end of the arm and the means pivoting said one end of the lever means to the free end of the arm so that retraction of said extensible and retractable means moves said lever means about its pivot to the free end in the direction of the frame and said link means swings the boom means about its pivotal attachment to said free end until the boom means attains the transport position with the clamping means supporting the load in an inverted position and extension of said means swings the lever means about its pivot in a direction away from the frame and the link means swings the boom means in the same direction until the boom means attains an angle relative to the frame permitting the clamping means to grip a load.

3. A vehicle as claimed in claim 2 further including power means between the frame and said arm for moving the arm toward and away from the frame.

4. A vehicle as claimed in claim 3 in which said power means is a hydraulic extensible and retractable device.

5. A vehicle as claimed in claim 1 in which the length of the boom means is adjustable hydraulically to vary the distance between said load clamping means.

6. A vehicle as claimed in claim 1 in which said clamping means is defined by clamping jaws cooperable with a rim on a container having faces complemental to the jaws.

7. A vehicle as claimed in claim 6 in which the boom means is provided with a cover plate serving to close an open-ended container.

8. A vehicle as claimed in claim 6 in which the container is provided with a rim of octagonal form and the clamping jaws engage the rim on three sides thereof.

9. A vehicle as claimed in claim 1 in which the clamping means is defined by jaws cooperable with a rounded rim on a container.

10. A vehicle as claimed in claim 6 in which the jaws have upwardly and downwardly inclined surfaces and the rim has corresponding faces whereby the container is centered heightwise upon closing of the jaws.

11. A vehicle as claimed in claim 1 in which said clamping means is defined by rake-like teeth.

12. A vehicle as claimed in claim 1 in which said clamping means is defined by blades.

13. A vehicle as claimed in claim 1 further including a load hook at the free end of the boom means.

14. A vehicle as claimed in claim 1 in which the boom means includes a piston and cylinder assembly and the clamping means being attached to the piston and cylinder respectively.

15. A vehicle as claimed in claim 1 in which the clamping means is defined as a rail adapted to enter a slotted pocket on a container.

16. A vehicle as claimed in claim 2 in which the distance between the pivotal attachment of the boom means to the free end of the arm and the means pivoting one end of the lever means to the free end of the arm is approximately three-fourths of the distance from the means pivoting one end of the lever means to the free end of the arm and the means pivoting one end of the link means to the lever means, the length of the link means being approximately one-half the distance between the pivotal attachment of the boom means to the free end of the arm and the means pivoting one end of the lever means to the free end of the arm, the distance from the pivotal attachment of the boom means to the free end of the arm and the means pivotally connecting the link means to the boom means being approximately equal to the distance between the pivotal attachment of the boom means to the free end of the arm and the means pivoting one end of the lever means to the free end of the arm and the distance between the means pivoting one end of the link means to the lever means and the means pivotally connecting the extensible and retractable means to the other end of the lever means being about one-half the length of the link means.

References Cited in the file of this patent

UNITED STATES PATENTS

| 2,724,620 | Johnson et al. | Nov. 22, 1955 |
| 2,742,165 | Pilch | Apr. 17, 1956 |
| 2,768,760 | Pilch | Oct. 30, 1956 |
| 2,817,448 | Pilch | Dec. 24, 1957 |
| 2,876,816 | Buch et al. | Mar. 10, 1959 |
| 2,935,214 | Fly | May 3, 1960 |